(12) United States Patent
Leviton (10) Patent No.: US 7,060,968 B1
(45) Date of Patent: Jun. 13, 2006

(54) METHOD AND APPARATUS FOR OPTICAL ENCODING WITH COMPRESSIBLE IMAGING

(75) Inventor: Douglas B. Leviton, Dunkirk, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 298 days.

(21) Appl. No.: 10/456,164

(22) Filed: Jun. 4, 2003

Related U.S. Application Data (60) Provisional application No. 60/385,472, filed on Jun. 4, 2002.

(51) Int. Cl.
*G01D 5/34* (2006.01)

(52) U.S. Cl. ............................ 250/231.13; 250/231.18; 341/13; 341/31

(58) Field of Classification Search ........... 250/231.13, 250/231.14, 231.18, 237 G; 341/13, 31; 33/1 PT; 356/614–618
See application file for complete search history.

(56) References Cited

U.S. PATENT DOCUMENTS

| | | | |
|---|---|---|---|
| 5,773,832 A | 6/1998 | Sayed et al. | |
| 5,818,039 A | * 10/1998 | Lampson | ............... 250/231.13 |
| 5,848,123 A | 12/1998 | Strommer | |
| 5,861,891 A | 1/1999 | Becker | |
| 5,965,879 A | 10/1999 | Leviton | |
| 6,031,892 A | 2/2000 | Karellas | |
| 6,246,050 B1 | 6/2001 | Tullis et al. | |

OTHER PUBLICATIONS

TC211 Timing of Full Frame CCD Image Sensor, Texas Instuments, Jun. 1996.
TC211 192- X 165- Pixel CCD Image Sensor, Texas Instruments, Jan. 1990.
LM 9637 Monochrome CMOS Image Sensor VGA 68 FPS, National Semiconductor Corporation, May 2002.

* cited by examiner

*Primary Examiner*—Stephone B. Allen
*Assistant Examiner*—Patrick J. Lee
(74) *Attorney, Agent, or Firm*—Christopher H. Kirkman (57) ABSTRACT

The present invention presents an optical encoder with increased conversion rates. Improvement in the conversion rate is a result of combining changes in the pattern recognition encoder's scale pattern with an image sensor readout technique which takes full advantage of those changes, and lends itself to operation by modern, high-speed, ultra-compact microprocessors and digital signal processors (DSP) or field programmable gate array (FPGA) logic elements which can process encoder scale images at the highest speeds. Through these improvements, all three components of conversion time (reciprocal conversion rate)—namely exposure time, image readout time, and image processing time—are minimized.

44 Claims, 8 Drawing Sheets

Direction of Motion

METHOD AND APPARATUS FOR OPTICAL ENCODING WITH COMPRESSIBLE IMAGING

CROSS-REFERENCES TO RELATED APPLICATIONS

The benefit of priority is claimed under 35 U.S.C. § 119(e) of U.S. Provisional Patent Application No. 60/385,472, filed Jun. 4, 2002, entitled "Optical, Absolute, Linear and Rotary, Position Encoders Using Vertically Compressible Imaging," which is incorporated herein by reference in its entirety.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The invention is directed to a method and apparatus for determining translational or rotary position through optical encoding using compressible imaging.

BACKGROUND ART OF THE INVENTION

An optical encoder measures a position of an object, either angular or transverse, by optically detecting marks on a scale attached to the object that moves with the object. In the simplest form, the encoder simply measures translation by counting the number of marks that move past the encoder's optical detector without ever losing count.

In a common form of such an encoder, a fixed scale and a moving scale, which have identical transparent, periodic markings on opaque backgrounds with 50% spatial duty cycle for each marking or period, are interposed between a light source and the detector. The relative locations of the transparent markings determine the amount of light which is allowed to be transmitted through each marking, e.g., full transmission, ½ or ¼ transmission, or none at all. By keeping track the number of periods which go past the fixed scale as the moving scale moves without losing count and by interpolating this variable transmission between periods, such an encoder measures relative or incremental displacement with respect to a reference or origin position. The incremental encoder does not measure absolute position which is independent of some volatile reference position. U.S. Pat. No. 5,965,879 ('879), which is incorporated by reference, teaches an absolute optical encoder with a scale having a pattern formed thereon, the pattern having a plurality of periods, each period of the plurality of periods including (a) a first portion called a fiducial bar which is identical for all of the plurality of periods and (b) a second portion which contains code bits identifying each particular period of the plurality of periods. The scale is attached to the object so that the scale moves with the object. The scale is illuminated and an image of a portion of the scale is formed on an image sensing detector. The detector means, such as a charge-coupled-device (CCD) image sensor, records an image of one period of the plurality of periods of the pattern which lies within a field of view of the detector means and outputs signals derived from the image. The field of view represents a fixed coordinate system. An analyzer receives the signals from the detector and (i) determines a location of the first portion of the one of the plurality of periods within the fixed coordinate system, (ii) decodes the second portion of the one of the plurality of periods to identify the one of the plurality of object in accordance with the location of the first portion determined in operation (i) and the identity determined in operation (ii).

A major limitation of the number of absolute optical pattern recognition encoders is a slow conversion rate, which indicates how many encoder readings the encoder system makes per unit time. That is, the conversion rate of these encoders is so low (<15 Hz) that the application space has been limited to very low bandwidths and industry has been reluctant to accept the technology for use in its applications which generally require conversion rates from 1 kHz to as high 100 kHz.

Generally, image readout from a CCD is accomplished by applying a specific sequence of electronic clocking pulses to the CCD's parallel and serial register gates. Ordinarily, full image readout from a CCD is accomplished by first applying one parallel clock pulse to shift image charge collected in the CCD's image area down by one row in the CCD's structure. When this is done, the row of image charge closest to the serial register is transferred to the serial register itself where it awaits readout in the form of an analog video signal through some sort of electronic charge-to-voltage conversion stage. (When it is desired to produce a digital image in a memory or image buffer, the analog video signal is processed through an analog-to-digital (A/D) converter.) Following the one row shift, a series of clock pulses (in number conceptually equal to the number of pixel columns in the CCD) are applied to the serial register gate to cause the image charge deposited in the serial register to shift toward the CCD's output node where a voltage suitable for A/D conversion is developed for each pixel column. The numeric brightness value for each image pixel in the image buffer is the digitally converted analog signal corresponding to the clock pulse which placed that pixel column's image charge onto the CCD's output node. This process of applying pulses to the CCD's parallel and serial register gates, repeated a number of times equal to the number of image rows in the CCD, affects a complete image readout at the CCD's highest spatial resolution.

Conversion time in previous pattern recognition encoders was limited primarily by the exposure time and the time required to read the entire image from the encoder's charge-coupled device (CCD) image sensor pixel by pixel (but not necessarily in that order). Image process time is considered to be analyzing processor platform dependent and simply devoting a faster processor to the task will always reduce image process time. However, the present invention further simplifies the image processing algorithm which improves image process time on any selected platform.

Previously, exposure time had to be long enough to produce adequately high signal-to-noise ratio in the portion of the encoder image at which bit patterns, which uniquely identity fiducial bars, are located so that the bits could be reliably detected. That the image had to be read out in its entirety, pixel by pixel, (that is, at full horizontal and vertical resolution) was necessitated by the fact that the encoder scale patterns contained substantial vertical information crucial to correct position determination through the image process, specifically in the arrangement of the row markers and code bits associated with each fiducial bar.

SUMMARY OF THE INVENTION

Binning is known in the art of electronic imaging as a process of combining contents of adjacent cells in an area array image sensor. In the present invention, for example, vertical binning is the partial or complete integration of charges disposed in a column of pixels. Horizontal binning which is the integration of charges disposed in image rows is also possible and is employed when the application warrants it.

The present invention is directed to an optical encoder for determining a position of an object comprising: a scale having a pattern formed thereon, the pattern being binnable and having a plurality of periods, means for relating motion between the scale and the object, means for illuminating the scale, means for forming an image of the pattern, means for detecting and outputting signals derived from a portion of the image of the pattern which lies within a field of view of the detector means; and, means for binning the signals from the detector means. The optical encoder further comprises analyzing means, receiving the signals from the binning means for determining the location of the object.

The invention is further directed to a method of determining a position of an object, the method comprising: (a) providing a scale having a binnable pattern formed thereon, the pattern having a plurality of periods, (b) relating motion between the scale and the object, (c) forming an image of the plurality of periods of the pattern which lie within a field of view, the field of view defining a fixed coordinate system, (d) binning the image, (e) finding, in accordance with the binned image, one of the plurality of periods within the field of view, (f) identifying the one of the plurality of periods within the fixed coordinate system; and (g) determining a coarse location of the object in accordance with the identity determined in step (f); (h) determining the location, in accordance with the binned image, of one of the plurality of periods within the fixed coordinate system of the field of view; and (i) determining a fine location of the object in accordance with the identity determined in step (f) and with the location of one of the plurality of periods determined in step (h).

The invention is further directed to embodiments the encoder with different binnable scale patterns. The invention is also directed to embodiments of the encoding method with additional steps. Such encoder embodiments and methods can achieve incremental or absolute encoding.

BRIEF DESCRIPTION OF THE DRAWINGS

The preferred embodiments of the invention will now be described in detail with reference to the figures, in which:

FIG. 3-(a) shows an incremental encoder embodiment of a pattern of scale markings in the field of view of the encoder of FIG. 1.

FIG. 3-(b) shows an analog readout of the pattern of scale markings in the field of the view of FIG. 3-(a).

FIGS. 4-(a) and (b) show a absolute encoder embodiment of a pattern of scale markings in the field of view of the encoder of FIG. 1, wherein the upper row of code bits are the same as the lower row of code bits;

FIG. 8-(a) shows components of a rotary encoder according to the present invention; and FIG. 8-(b) shows a pattern of scale markings in the field of view of the rotary encoder of FIG. 8-(a).

DETAILED DESCRIPTION OF PREFERRED EMBODIMENTS OF THE INVENTION

The present invention is directed to an optical pattern recognition encoder with conversion rates exceeding 20 kHz. Compared to the previous optical encoders, the improvements are a result of combining changes in the pattern recognition encoder's scale pattern with an image sensor readout technique which takes full advantage of those changes, and lends itself to operation by modern, high-speed, ultra-compact microprocessors and digital signal processors (DSP) or field programmable gate array (FPGA) logic elements which can process encoder scale images at the highest speeds, and further process one image while the next one is being exposed and read out, thereby further increasing speed. Through these improvements, all three components of conversion time (reciprocal conversion rate)—namely exposure time, image readout time, and image processing time—are minimized.

Figure 1:
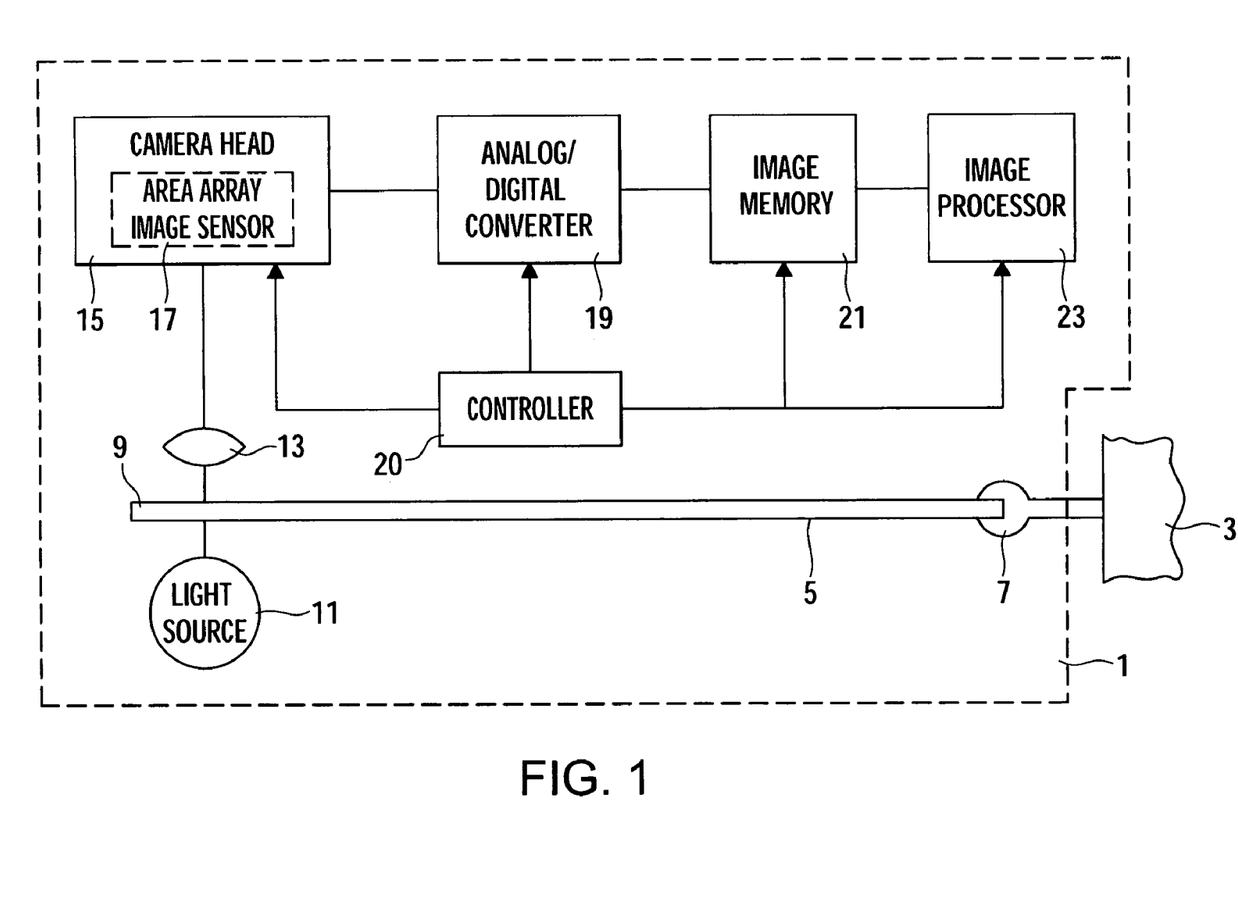
FIG. 1 shows a block diagram of an encoder system in accordance with the present invention.

FIG. 1 shows an embodiment of an encoder system in accordance with the invention. Encoder system 1 determines the displacement of object 3, which moves translationally or tangentially in a plane perpendicular to the plane of the drawing. Encoder system 1 includes scale 5, which is rigidly attached to object 3 by attachment 7 so that pattern 9 on scale 5, which will be described in detail below, is carefully aligned with the direction of motion of object 3. It is also possible to hold the scale fixed and to attach the light source and detector to the object to encode, e.g., movement along a railroad track, the track being analogous to the scale. Scale 5 is preferably made of glass, with transparent pattern 9 on an opaque background. However, the scale may be made of any suitable materials. Pattern 9 is preferably formed on top of scale 5. However, the pattern may be formed in any surface. Stationary light source 11, which preferably outputs visible light, illuminates scale 5 from below. Other modes of illumination, such as edge illumination, or using light of other wavelengths, can be used instead. Light transmitted through scale 5 is made incident on stationary imaging lens arrangement or other optical projecting arrangement including simply casting a shadow 13, which projects an image of a portion of pattern 9 onto camera head 15.

In camera head 15, area array image sensor 17 detects the image of the scale 5 as individual picture elements (pixels). Area array image sensor 17 is capable of binning charges disposed in a number of rows of pixels into a single row. In other words, through the binning process, charges disposed in a number of pixels in a column are vertically combined into a cell of the serial register 212, that register being parallel to the rows of pixels of the image area.

The encoder of the present invention pertains to the field of both absolute and incremental optical encoders.

After the binning process, the serial register is to be loaded with combined charges of each column of the area array image sensor 17. Signals corresponding to the integrated brightness in individual pixel columns are binned in the area array image sensor 17 and transferred to analog/digital converter 19, which digitizes the signals to produce digital data and outputs the digital data to image memory 21.

Image processor 23 analyzes the binned digital data from the area array image sensor 17 residing in image memory 21 to produce position information about the object 3. Controller 20 receives commands from a host and coordinates operational timing of the area array image sensor 17, digitization of the image by analog/digital converter 19, storage of the image in image memory 21, and computation of position by the image processor 23 in such a way that one binned image can be processed while the next image is being exposed and read out, thereby further increasing speed of the encoding operation.

Figure 2:
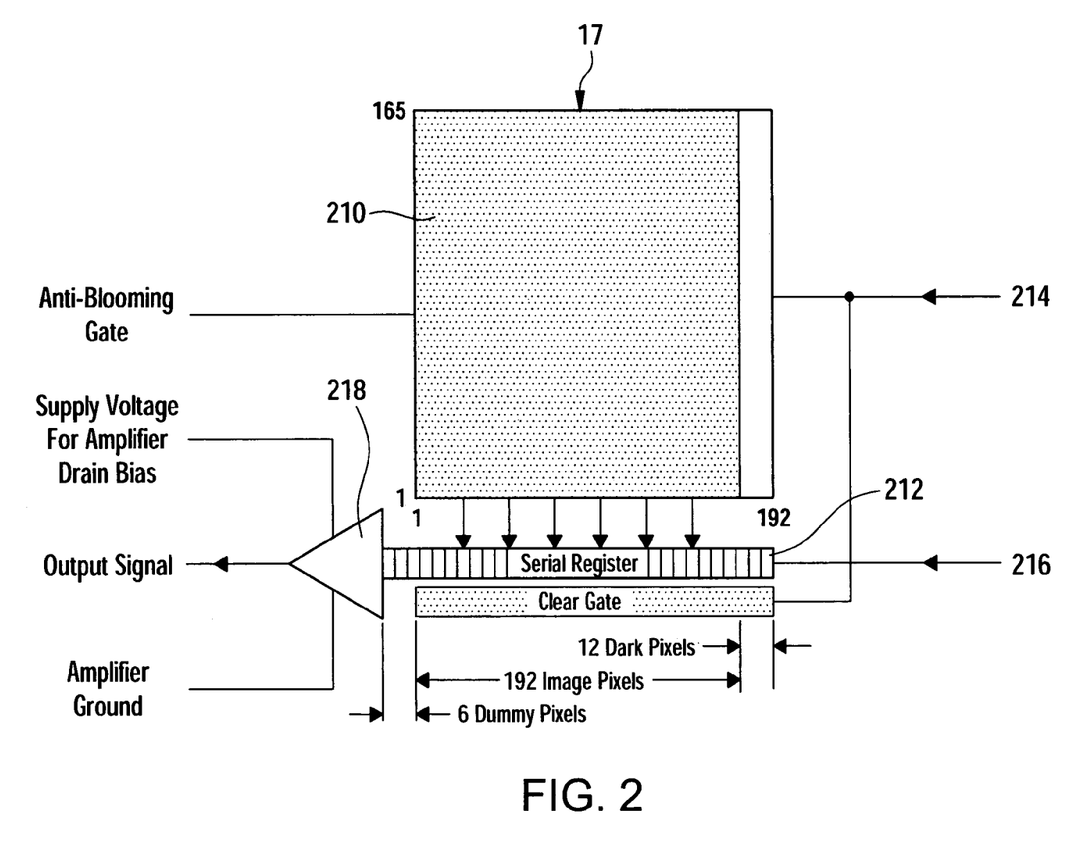
FIG. 2 shows a functional block diagram of a TC211 192×165-pixel area array Image Sensor, which is one embodiment of an area array Image Sensor of the present invention.

FIG. 2 shows one embodiment of area array image sensor 17, which is implemented in the TC211 192×165-Pixel CCD Area Array Image Sensor manufactured by Texas Instruments. Of course other image sensors may be used, and the invention is not limited to this embodiment. The image-sensing area 210 consists of 165 horizontal image lines (rows) each containing 192 photosensitive elements (pixels).

After light enters the image-sensing area 210, photo-electron charges generated are transferred from the image-sensing area 210 to the serial register at the rate of one image line per each clock pulse applied to the image-area gate 214. Once each image line has been transferred into the serial register 212, the serial-register gate 216 can be clocked until all of the charges are removed out of the serial register 212 to the charge detection node at the amplifier input 218.

Vertical binning is achieved in an area array image sensor 17 by modifying the sequence of electronic clocks applied to the image area gate 214 and serial register gates 212 compared to that used when reading out an entire image from the sensor in the conventional manner. Instead of shifting the image down into the serial register 212 one row at a time, multiple sequential parallel clock pulses are issued to the image-area gate 214 before the serial register 212 is clocked to affect vertical integration of image charge for as many rows as parallel clock pulses are applied. When this is done, vertical resolution is lost, but readout time for all image charge is reduced proportionately by the binning factor, that is, the number of image rows shifted per serial register clocking. If losing vertical resolution is of no practical consequence to the imaging application, then enhancement of readout speed is a benefit. Such is the case with the use of binning for the present invention. It is to be noted that horizontal bars and horizontal binning are used when warranted by an application.

Figure 3:
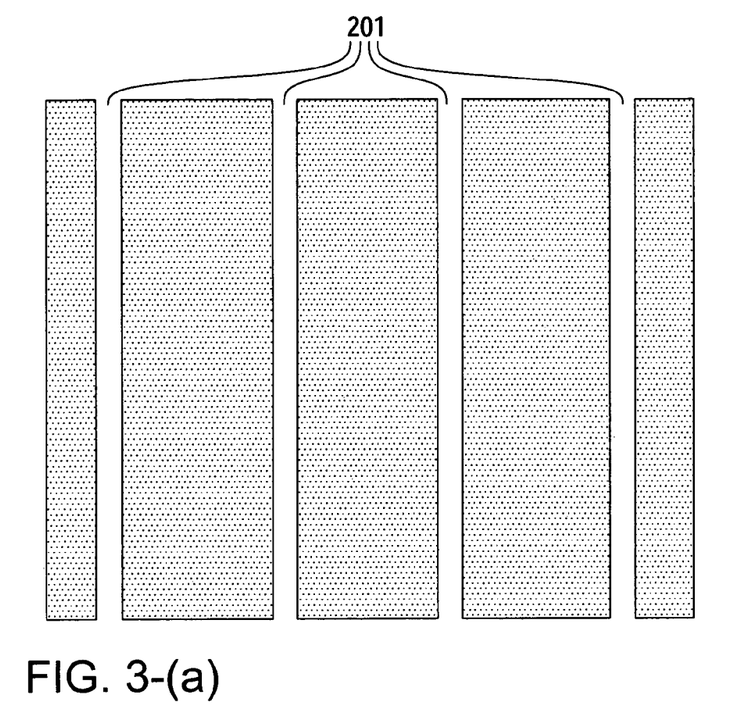

FIG. 3-(*a*) is an example of a binnable pattern of an incremental encoder. For incremental encoding, only the vertical stripes or fiducials 201, which may run from bottom to top of the images are required for determining position of object 3. Fiducials may alternately be other patterns, not just vertical stripes. FIG. 3-(*b*) shows an analog readout signal of the binned pattern of FIG. 3-(*a*) for an incremental encoder. This readout can be measured as the voltage output of the amplifier for the serial register 212. Other area array image sensing means in which binning can be implemented, such as CMOS image sensors, can be used.

Figure 4:
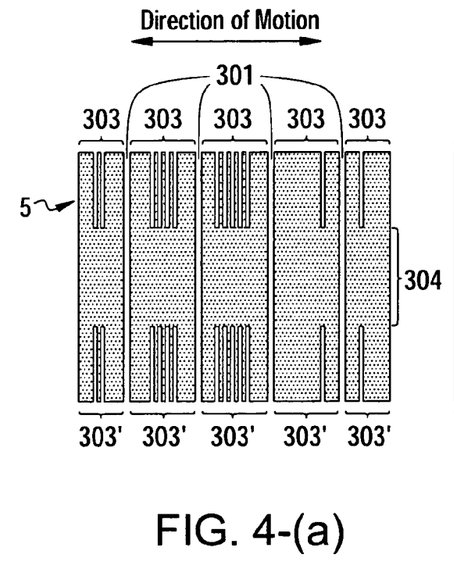

FIGS. 4-(*a*) and 4-(*b*) are examples of images of binnable patterns on encoder scale 5 for an absolute encoder. The vertical stripes, first portion, which extend from bottom to top of the images are fiducials 301. Again fiducials may be of any patterns. The shorter stripes which extend from the top and from the bottom of the images are code bits 303 (second portion), and 303' (third portion). It is to be noted that the images of fiducials 301 and code bits 303, 303', on the area array image sensor 17 need not extend from either top or bottom of the area array image sensor 17. In other words, an image detected on the area array image sensor 17 may contain blank regions at either top or bottom end or at both ends of both portions of code bits and at both ends of fiducials.

For this particular type of binnable encoder scale pattern, the code bits 303 (second portion) are the same at the top as at the bottom 303' (third portion) so that the image can be binned by the full height of the detector (number of detector rows). FIG. 4-(*a*) shows the progression of the binary pattern of code bits, with the least significant bit (LSB) on the left, for the sequence of fiducials 301 from left to right of 011110, 011111, 100000 identifying fiducial numbers 30, 31, and 32, respectively. FIG. 4-(*b*) shows the progression of the binary pattern of code bits 303, 303' for the sequence of fiducials 301 from left to right of 000101, 000110, 000111 identifying fiducial numbers 5, 6, and 7, respectively. In this case, fiducial 6 happens to be centered exactly over the center pixel column in the image which is defined to be the local reference column for the detector. When the fiducial 0 is centered on that column, the position of object 3 is defined to be absolute 0. According to this definition, for FIG. 4-(*b*), the position is equal to 6 times the scale pitch or period of pluralities. So for example, if the scale pitch is 600 microns, the position readings would be 3600.000 microns or 3.600000 mm. The number of significant digits shown here for this absolute position is reasonable to represent the achievable resolution capability of an encoder of this type having a scale pitch of 600 microns. In FIG. 4-(*a*), since there are two fiducials straddling the center column, the position indicated by the image might read something like 31.52974 mm for a scale having 1000 micron pitch. For a scale having 100 micron pitch, the reading would be 3.512974 mm.

The images shown in FIGS. 4-(*a*) and 4-(*b*) can of course be read out from the sensor at binning parameters other than that which would read the sensor out at full height—at the expense of conversion rate, but to the benefit of (i) signal to noise ratio, (ii) measurement of image background, (iii) position sensitivity, and (iv) redundancy of fiducial identification.

Figure 5:
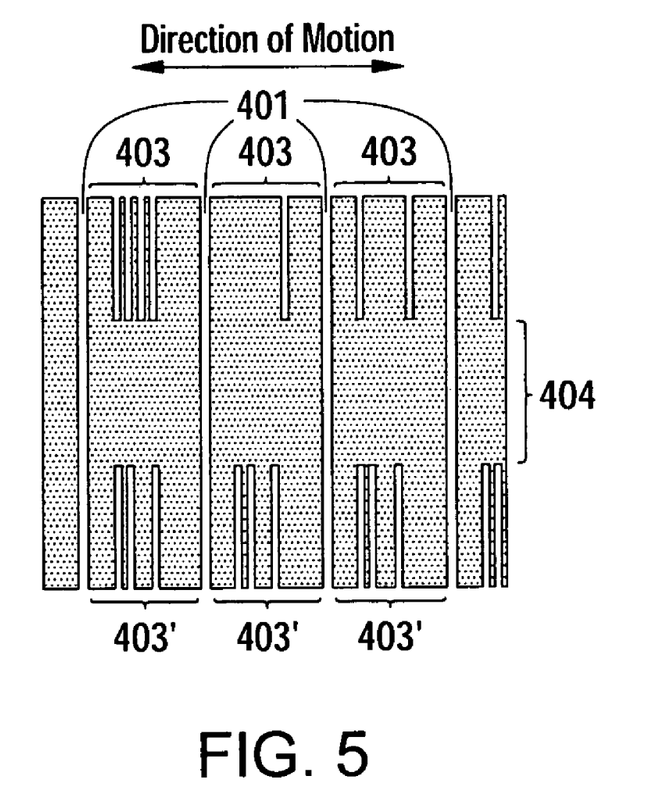
FIG. 5 shows another absolute embodiment of a pattern of scale markings in the field of view of the encoder of FIG. 1, wherein the upper row of code bits are different from the lower row of code bits.

FIG. 5 shows another code bit pattern for an absolute encoder, in which the row of code bits 403 (second portion), 403' (third portion) are different. The lower row of code bits 403' may be less significant bits than the upper row 403 or vice versa. This pattern allows more fiducials 401 to be represented in the same amount of image space as in FIGS. 4-(*a*) and 4-(*b*) and thus extends the range of encoded positions in that many more fiducials can be identified over the length of the scale pattern, but all identified using the same image area. It is to be noted that between the upper code bits 403 and the lower code bits 403' is a blank area 404, in which no code bits are displayed. Such a pattern as in FIG. 5, however, cannot be read out by vertically binning the entire height of the detector because some essential, vertical information content would be destroyed. Nonetheless, substantial vertical binning, in this case by half the image height, can still be enjoyed, and the area in the middle of the image, still being blank, lends itself to good image background level characterization. One can easily imagine code bits arranged in even more rows than two, and thus even more encoded range. Meanwhile, less but still substantial vertical binning with its corresponding increase in conversion rate can could be accomplished.

In FIG. 5, the five most significant bits (MSB) of ten total are at the bottom of the image and the five LSB's are at the top of the image. The very LSB is at top left and the very MSB is at bottom right. For the leftmost fiducial, its identifying bits lie immediately to its right. Its bits 0,1,2,3,5,6, and 8 are showing, so the fiducial is identified as $2^0+2^1+2^2+2^3+2^5+2^6+2^8=1+2+4+8+32+64+256=367$. The fiducial to the left of the image center has bits 4,5,6, and 8 showing, so the fiducial is identified as $2^4+2^5+2^6+2^8=16+32+64+256=368$. The fiducial to the right of the image center has bits 0,4,5,6, and 8 showing, so the fiducial is identified as $2^0+2^4+2^5+2^6+2^8=1+16+32+64+256=369$. The identity of the rightmost fiducial would correctly be inferred by the image process as number 370, and so that fiducial can also contribute to the average encoded position.

Figure 6:
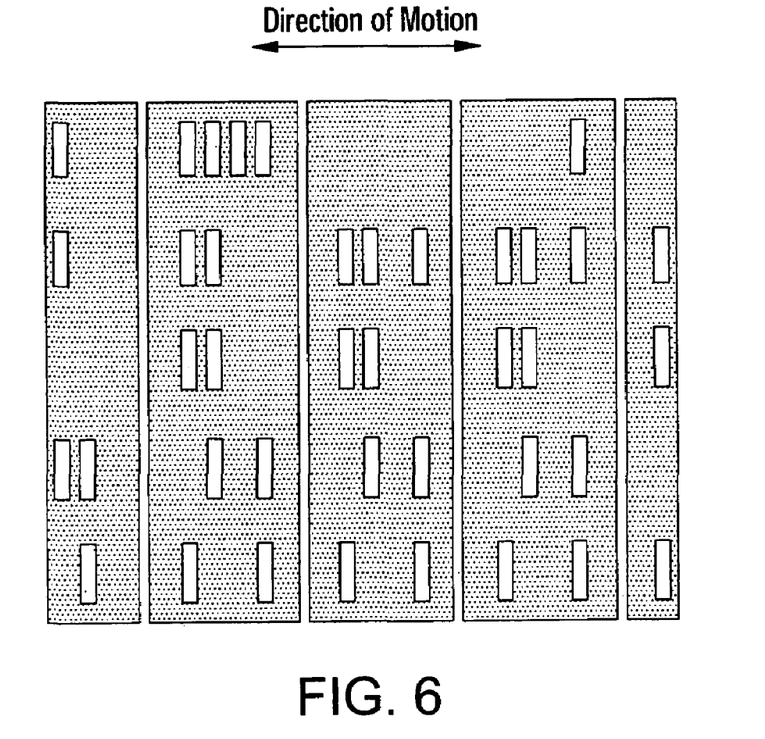
FIG. 6 shows a absolute encoder embodiment of a pattern of scale markings in the field of view of the absolute encoder of FIG. 1, wherein there are more than two rows of code bits.

In FIG. 6, an example of a pattern with another possible arrangement of a plurality of code bits is shown. In this case, there are five rows of four code bits per row. The four MSB's of twenty total for each code group are nearest the bottom of the image and the four LSB's are nearest the top of the image. In this example, the very LSB is at top right and the very MSB is at bottom left. For the leftmost fiducial, its identifying bits lie immediately to its right. Its bits 0,1,2,3,6,7,10,11,12,14,16,19 are showing, so the fiducial is identified as:

$2^0+2^1+2^2+2^3+2^6+2^7+2^{10}+2^{11}+2^{12}+2^{14}+2^{16}+2^{19}=$ $1+2+4+8+64+128+1024+2048+4096+16384+65536+524288=$

613583.

The fiducial to the left of the image center has bits 4,6,7,10,11,12,14,16,19 showing so the fiducial is identified as $2^4+2^6+2^7+2^{10}+2^{11}+2^{12}+2^{14}+2^{16}+2^{19}=$ $16+64+128+1024+2048+4096+16384+65536+524288=$

613584.

Similarly, the fiducial to the right of the image center is identified as 613585. The identity of the rightmost fiducial would correctly be inferred by the image process as number 613586, and so that fiducial can also contribute to the average encoded position. If the scale were to have a pitch of 10 mm, as could easily be made on a perforated metal tape or on a printed strip of some material appropriate to the application, the encoded position would have a value of roughly 6.135 kilometers and the positional resolution would be roughly 1 micrometer.

To properly decode the fiducials in an image for this pattern, the image would have to be read out in at least five sections. So, the degree of vertical binning for this pattern could be no higher than the total number of image rows divided by 5.

It is to be noted that an embodiment with any number of code bits can also be used to determine incremental position of an object. For example, it is possible to determine a location of the first portion of the one of the plurality of periods within the fixed coordinate system by selecting only those binned cells in the vicinity of cells having integrated charge exceeding some predetermined value, those cells representing only the first portions of the plurality of periods and not the second or third portions.

Figure 7:
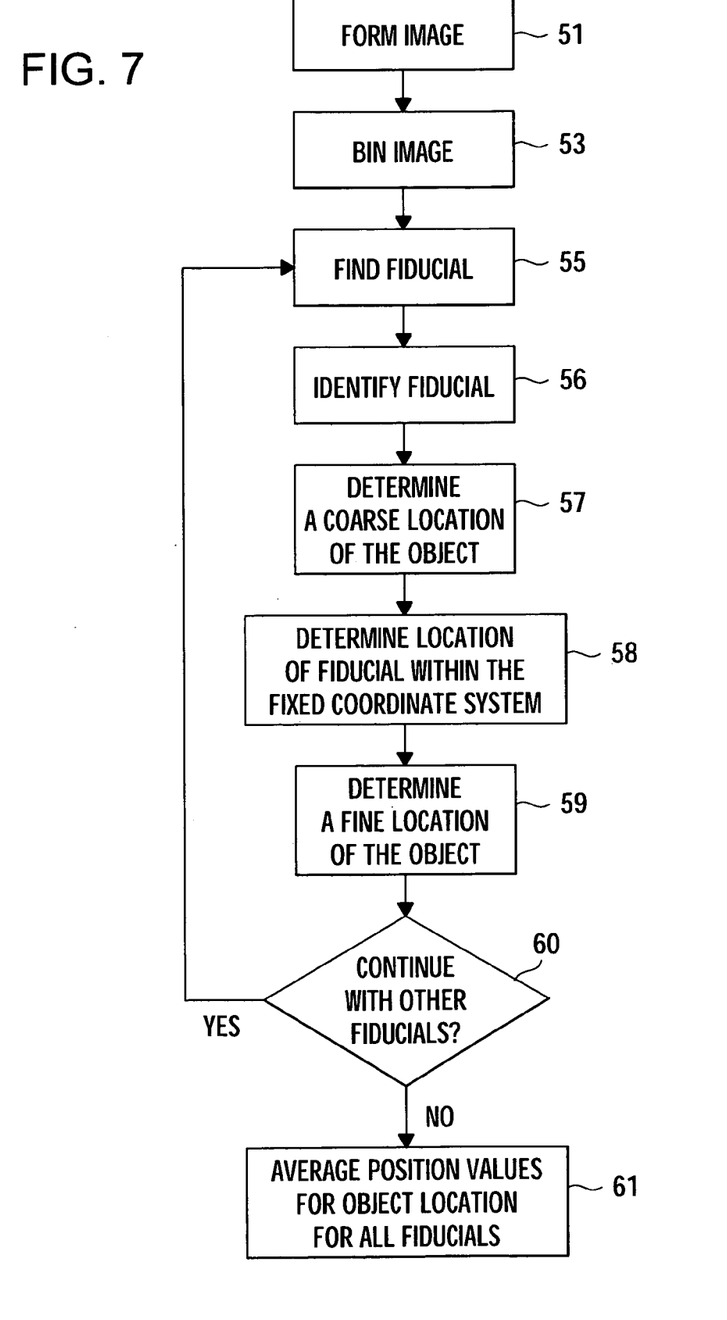
FIG. 7 shows a flow chart of a method of determining a position of an object by using the encoder of FIG. 1.

The manner in which encoder 1 uses pattern 9 to determine the position of the object will now be explained with reference to the flow chart of FIG. 7. Once the image on area array image sensor 17 is formed (step 51) and binned (step 53), analog/digital converter 19 digitizes the binned information from area array image sensor 17 and provides that information to memory 21. Image processor 23, which may be any appropriately programmed computer, derives the position information for the moving object 3 in accordance with the relationship between the coordinate frame and the pixel locations using an operation which performs the following functions: (1) finding, in accordance with the binned image, one of the plurality of periods within the field of view (step 55); (2) identifying the one of the plurality of periods within the fixed coordinate system (step 56) (3) determining a coarse location of the object in accordance with the identity determined in (2)(step 57); (4) determining the location, in accordance with the binned image, of the one of the plurality of periods within the fixed coordinate system of the field of view (step 58), and (5) determining a fine location of the object in accordance with the identify determined in (2) and the location determined in step (4) (step 59). Image processor 23 further performs the functions: (6) repeating (1) through (5) with different periods within the field of view (steps 55 through 59), and (7) averaging the position values for the location of the object derived from all periods found within the field of view (step 61).

For absolute encoding, the step of identifying includes decoding the code bits in accordance with the binned image of the plurality of periods. Meanwhile, for incremental encoding, the step of identifying includes counting, in accordance with the binned image, the number of periods which have passed the fixed coordinate system with respect to the origin period.

The purpose of step 59 is to determine the position of the image of the fiducial with respect to the pixel coordinate frame along the direction of motion and to thereby encode the motion. Any number of computational operations can be used to perform this function, including edge detection, peak detection, derivative, etc. However, the preferred embodiment of the encoding system computes the one-dimensional centroid of the fiducial in the direction of motion in the fixed coordinate system.

It is to be noted that incremental encoding can be accomplished both with an incremental scale pattern such as in FIG. 3-(a) and with absolute scale patterns such as in FIGS. 4, 5, and 6. For incremental encoding with absolute scale patterns, fiducials are distinguished from code bits in step 55 through their binned signal amplitudes.

Figure 8:
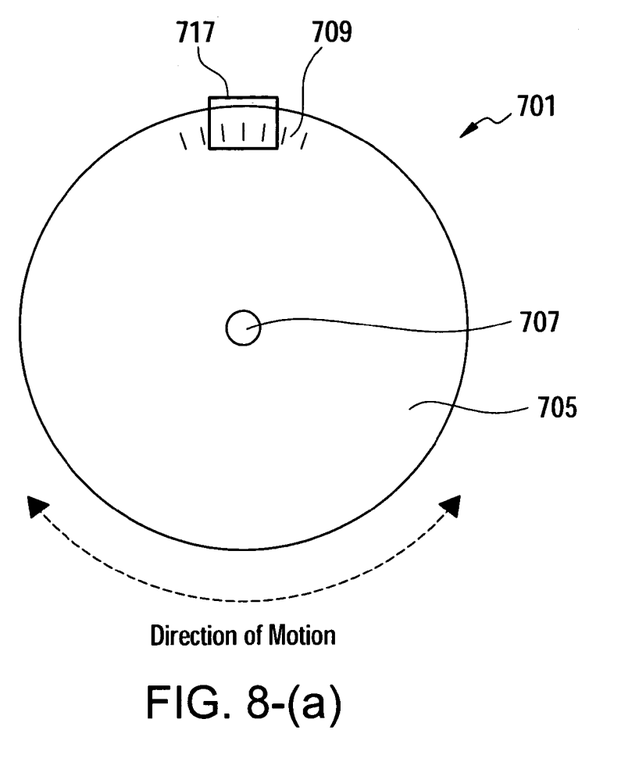

FIG. 8-(a) shows components of a rotary encoder according to another preferred embodiment of the present invention. In a rotary encoder 701, scale 705 is mounted to rotate coaxially with an object (not shown) by means, for example, of axle 707 or of a hollow bearing. Scale has pattern 709 formed thereon. Pattern 709 is such that the image of the pattern 709 detected by area array image sensor 717 is binnable. FIG. 8-(b) shows an example of a binnable pattern of scale markings in the rotary encoder of FIG. 8-(a).

Besides the advantage of binnable encoder scale patterns and binned CCD readout, the present invention provides the following advantages which serve to increase conversion rate:

1) various tasks performed in the previous encoder's image process are eliminated thus further reducing image process time and;

2) exposure times are reduced in order to avoid saturating the CCD's serial register as a result of integrating image charge in the serial register through binning.

While increasing conversion rate, for the same amount of allowable scale image blur due to object motion, the present invention also allows speeds of motion which are higher than previously achievable by a factor equal to the binning factor. For certain patterns, an additional advantage exists in that the code bits uniquely identifying the fiducials in the image, can be read out more than once, giving the fiducial identifying process substantial redundancy, making the encoder even more robust and reliable. At the same time the blank image area between the redundant rows of code bits is used to gather photometric background information used to correct the image data distribution in the vicinity of the fiducials so that the most accurate fiducial centroids can be produced.

Specifically, the image processing tasks which are eliminated are searching for row markers, establishing vertical and horizontal offset pixel coordinates in the search for the locations of code bits in the image, searching for the rows in the image containing only fiducial bars, and the binning of those rows in software.

Yet another advantage of the new patterns is a natural increase in the integrated signal strength for centroiding of the fiducials in the image, since the fiducial images now extend for the entire height of the image sensor instead of for only 50–70% of that height.

Further advantages of the improved encoding scheme have to do with operational tradeoffs between requirements on speed of motion, conversion rate, and certainty of position determination in a motion control system which would use the improved encoder and the relationship between those aspects of motion control and the amount of binning that should be commanded in the encoder.

Specifically, when motion velocity is high, it is generally important in motion control for position sensor conversion rate to be maximized and data latency to be minimized. Meanwhile, the lowest levels of uncertainty of position determination are not required because the rate of change of position is so high that fine granularity in position knowledge is unimportant. At the other extreme, when velocity is very low or zero, certainty of position determination is paramount while conversion rate and data latency are relatively unimportant.

The improved encoder manages position measurement requirements for these motion regimes in real time in that the amount of binning in the encoder can be commanded by the motion control system itself, depending on measured velocity conditions. When velocity is high, the encoder can be commanded to bin scale images by the entire height of the detector thereby minimizing exposure time, image readout time, and image process time, and thus maximizing conversion rate and minimizing data latency. This will, however, be at some minor but affordable expense to certainty of position determination due to less than optimal signal to noise ratio in the vertically integrated signal from the fiducial images. On the other hand, when velocity is low, the host motion control system can command the encoder not to bin at all so that the signal to noise ratio in the vertically integrated signal from the fiducial images will be maximized and position determination will be ultra-precise and accurate. This will come at some minor yet affordable expense to conversion rate and data latency. Position determinations for intermediate motion velocities can obviously be handled by the host commanding intermediate levels of binning.

Another advantage of the new fully binnable pattern is that, in general, the alignment of the image sensor to the scale in the direction perpendicular to travel (parallel to the fiducials) is far less critical than for the previous version of the pattern recognition encoder. This is because of the lack of actual vertical information content in the new scale pattern and the fact that the binned data distribution does not depend on the vertical alignment of the pattern to the image sensor for about half the height of the image. This makes it easier to design, assemble, install, and align encoders based on the new pattern.

Because the modifications noted above and other modifications are possible within the scope of the present invention, the present invention should be construed as limited only by the appended claims.

What is claimed is:

1. An optical encoder for determining a location of an object, the optical encoder comprising:
   a scale having a pattern formed thereon, the pattern having a plurality of periods;
   means for relating motion between the scale and the object;
   means for illuminating the scale;
   means for forming an image of the pattern;
   means for detecting and outputting signals derived from a portion of the image of the pattern which lies within a field of view of the detector means, the field of view defining a fixed coordinate system;
   means for binning the signals from the detector means to define a binned image; and
   analyzing means, receiving the signals from the binning means for determining the location of the object, wherein the analyzing means:
   (i) finds, in accordance with the binned image, one of the plurality of periods within the field of view;
   (ii) identifies the one of the plurality of periods within the fixed coordinate system; and
   (iii) determines a coarse location of the object in accordance with the identity determined in (ii).

2. The optical encoder as in claim 1, wherein the encoder is a rotary encoder.

3. The optical encoder as in claim 1, wherein the analyzing means further:
   (iv) determines a location, in accordance with the binned image, of the one of the plurality of periods within the fixed coordinate system of the field of view; and
   (v) determines a fine location of the object in accordance with the identity determined in (ii) and the location determined in step (iv).

4. The optical encoder as in claim 3, wherein the analyzing means further:
   (vi) repeats (i) through (v) with different periods within the field of view; and
   (vii) averages values for the location of the object derived from all periods found within the field of view.

5. The optical encoder as in claim 1, further comprising:
   means for controlling timing of the detector means and the analyzing means.

6. The optical encoder as in claim 5, wherein the controlling means is for controlling timing of operation of the detector means and the analyzing means in such a way that one binned image can be processed while a next image is being exposed and read out.

7. The optical encoder as in claim 1, wherein the binning means:
   completely, vertically integrates charges disposed in each column of pixels.

8. The optical encoder as in claim 1, wherein the binning means:
partially, vertically integrates charges disposed in each column of pixels.

9. The optical encoder as in claim 1, wherein the binning means:
completely, horizontally integrates charges disposed in each row of pixels.

10. The optical encoder as in claim 1, wherein the binning means:
partially, horizontally integrates charges disposed in each row of pixels.

11. The optical encoder as in claim 4, wherein the analyzing means comprises an analog/digital converter for converting the binned signals into digital data.

12. The optical encoder as in claim 11, wherein the analyzing means further comprises an image memory for storing the digital data.

13. An optical encoder as in claim 11, wherein the analyzing means comprises an image processor for performing operations (i) through (vii) in accordance with the digital data.

14. The optical encoder as in claim 1, wherein all of the plurality of periods are identical.

15. The optical encoder as in claim 1, wherein each of the plurality of periods includes (a) a first portion which is identical for all of the plurality of periods and (b) a second portion which identifies each of the plurality of periods.

16. The optical encoder as in claim 1, wherein each of the plurality of periods includes:
(a) a first portion which is identical for all of the plurality of periods;
(b) a second portion which identifies each of the plurality of periods, the second portion being disposed on one side of one axial end of the first portion; and
(c) a third portion which identifies each of the plurality of periods, the third portion being disposed on the same side of the other axial end of the first portion as (b) is disposed.

17. The optical encoder as in claim 16, wherein the second portion and the third portion include the same code bits.

18. The optical encoder as in claim 16, wherein the second portion and the third portion include different code bits.

19. The optical encoder as in claim 1, wherein each of the plurality of periods includes:
a first portion which is identical for all of the plurality of periods; and
a second portion, comprising a plurality of code bits disposed in rows within each of the plurality of periods collectively identifying each of the plurality of periods.

20. A method of determining a lotion of an object, the method comprising:
(a) providing a scale having a pattern formed thereon, the pattern having a plurality of periods;
(b) relating motion between the scale and the object;
(c) forming an image of the plurality of periods of the pattern which lie within a field of view, the field of view defining a fixed coordinate system;
(d) binning the image;
(e) finding, in accordance with the binned image, one of the plurality of periods within the field of view;
(f) identifying the one of the plurality of periods within the fixed coordinate system; and
(g) determining a coarse location of the object in accordance with the identity determined in (f).

21. The method as in claim 20, further comprising:
(h) determining a location, in accordance with the binned image, of the one of the plurality of periods within the fixed coordinate system of the field of view; and
(i) determining a fine location of the object in accordance with the identity determined in (f) and the location determined in step (h).

22. The method as in claim 21, further comprising:
(j) repeating (e) through (i) with different periods within the field of view; and
(k) averaging values for the location of the object derived from all periods found within the field of view.

23. The method as in claim 20, wherein all of the plurality of periods are identical.

24. The method as in claim 23, wherein the method further comprises:
setting an origin period.

25. The method as in claim 24, wherein the step of identifying the one of the plurality of periods includes:
counting, in accordance with the binned image, the number of periods which have passed the fixed coordinate system with respect to the origin period.

26. The method as in claim 20, wherein each of the plurality of periods includes a first portion which is identical for all of the plurality of periods and a second portion which identifies each of the plurality of periods.

27. The method as in claim 26, wherein the method further comprises:
setting an origin period.

28. The method as in claim 27, wherein the step of identifying the one of the plurality of periods includes:
counting, in accordance with the binned image, the number of periods which have passed the fixed coordinate system with respect to the origin period.

29. The method as in claim 26, wherein the step of identifying the one of the plurality of periods includes:
decoding, in accordance with the binned image, the second portion of the plurality of periods to identify the one of the plurality of periods.

30. The method as in claim 20, wherein each of the plurality of periods includes a first portion which is identical for all of the plurality of periods, a second portion which identifies each of the plurality of periods, the second portion being disposed on one side of one axial end of the first portion, and a third portion which identifies each of the plurality of periods, the third portion being disposed on the same side of the other axial end of the first portion.

31. The method as in claim 30, wherein the method further comprises:
setting an origin period.

32. The method as in claim 31, wherein the step of identifying the one of the plurality of periods includes:
counting, in accordance with the binned image, the number of periods which have passed the fixed coordinate system with respect to the origin period.

33. The method as in claim 30, wherein the step of identifying the one of the plurality of periods includes:
decoding, in accordance with the binned image, the second and the third portions of the plurality of periods to identify the one of the plurality of periods.

34. The method as in claim 20, wherein each of the plurality of periods includes a first portion which is identical for all of the plurality of periods and a second portion, comprising a plurality of code bits disposed in rows within each of the plurality of periods collectively identifying each of the plurality of periods.

35. The method as in claim 34, wherein the method further comprises:
setting an origin period.

36. The method as in claim 35, wherein the step of identifying the one of the plurality of periods includes:
counting, in accordance with the binned image, a number of periods which have passed the fixed coordinate system with respect to the origin period.

37. The method as in claim 34, wherein the step of identifying the one of the plurality of periods includes:
decoding, in accordance with the binned image, the second portion of the plurality of periods to identify the one of the plurality of periods.

38. An optical encoder for determining an absolute location of an object along a direction of motion, comprising:
a scale configured to move with the object;
a pattern associated with the scale, the pattern comprising a plurality of periods, wherein each of the plurality of periods comprises:
a first portion that is identical for all of the plurality of periods; and
a second portion that identifies each of the plurality of periods, wherein the first portion is spaced from the second portion in the direction of motion;
a light source to illuminate the scale and to project an image;
an image sensor to detect image data in a two-dimensional pixel array and to bin the image data into a one-dimensional pixel array; and
an image processor to analyze the binned image data to determine the absolute location of the object.

39. The optical encoder of claim 38, further comprising a controller to control the image sensor and the image processor.

40. The optical encoder of claim 38, wherein the motion comprises a translation.

41. The optical encoder of claim 38, wherein the motion comprises a rotation.

42. The optical encoder of claim 38, wherein each of the plurality of periods further comprises a third portion that identifies each of the plurality of periods, wherein the third portion is collocated with the second portion in the direction of motion.

43. The optical encoder of claim 42, wherein the second portion and the third portion comprise identical code bits.

44. The optical encoder of claim 42, wherein the second portion and the third portion comprise different code bits.

* * * * *

UNITED STATES PATENT AND TRADEMARK OFFICE
CERTIFICATE OF CORRECTION

| | | |
|---|---|---|
| PATENT NO. | : 7,060,968 B1 | Page 1 of 1 |
| APPLICATION NO. | : 10/456164 | |
| DATED | : June 13, 2006 | |
| INVENTOR(S) | : Douglas B. Leviton | |

It is certified that error appears in the above-identified patent and that said Letters Patent is hereby corrected as shown below:

column 11, line 52, "lotion" shuold read --location--.

Signed and Sealed this

Fifteenth Day of August, 2006

JON W. DUDAS
*Director of the United States Patent and Trademark Office*